United States Patent Office 3,153,062
Patented Oct. 13, 1964

3,153,062
13α-ANDROST-5-ENE-3β,17α-DIOL AND ESTERS THEREOF
Leland J. Chinn, Morton Grove, Ill., assignor to G. D. Searle & Co., Chicago, Ill., a corporation of Delaware
No Drawing. Filed July 20, 1962, Ser. No. 211,404
4 Claims. (Cl. 260—397.5)

This invention relates to 13α-androst-5-ene-3β,17-diols, esters thereof, and processes whereby these diols and their esters can be prepared. More particularly, this invention provides new and useful chemical compounds of the formula

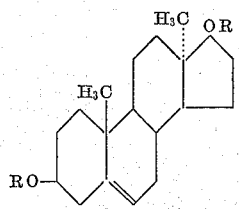

wherein R represents hydrogen or an alkanoyl radical and the "OR" substituent on carbon atom number 17 can be in either α or β configuration.

Among the alkanoyl radicals represented by R especially lower alkanoyl radicals are preferred, which is to say, radicals of the formula —CO-lower alkyl in which "lower alkyl" designates a methyl, ethyl, propyl, isopropyl, butyl, sec-butyl, tert-butyl, pentyl, neopentyl, hexyl, isohexyl, heptyl, or like saturated, acyclic, straight- or branched-chain, monovalent, hydrocarbon grouping of the formula $-C_nH_{2n+1}$ wherein n represents a positive integer less than 8.

The compounds to which this invention relates are useful by reason of their valuable and unexpected pharmacological properties. Thus, for example, 3β,17α-diacetoxy-13α-androst-5-ene, a representative ester deriving from the corresponding 3β,17-diol, is an antiprogesterone. Distinct from the 13β,17β-epimer of the prior art, it inhibits progesterone-induced uterine arborization.

Preparation of the subject compounds proceeds by reducing 3β-hydroxy-13α-androst-5-en-17-one [Rec. des Trav. Chim. des Pays-Bas, 77, 1010 (1958)] with lithium aluminum hydride or the equivalent (for example, sodium borohydride or sodium and 2-propanol) to give a mixture of 13α-androst-5-ene-3β,17α-diol and 13α-androst-5-ene-3β,17β-diol, which is separable by fractional crystallization. The diols, in turn, afford the corresponding esters by contacting with pyridine and an appropriate alkanoic acid anhydride.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are at 25° and referred to the D line of sodium.

Example 1

*13α-androst-5-ene-3β,17α-diol.*—To a mixture of 1 part of lithium aluminum hydride and 70 parts of anhydrous ether at the boiling point under reflux is added, with agitation during ¼ hour, a solution of 1 part of 3β-hydroxy-13α-androst-5-en-17-one in a mixture of approximately 6 parts of tetrahydrofuran and 98 parts of anhydrous ether. The resultant mixture is maintained at the boiling point under reflux with agitation for 18 hours, then chilled to 0–5°, decomposed with water, and acidified with 5% hydrochloric acid. The ethereal phase is separated and successively washed with 5% hydrochloric acid, water, and a saturated aqueous solution of sodium chloride, then dried over anhydrous sodium sulfate and stripped of solvent by vacuum distillation. The solid residue, upon repeated crystallization from ether, affords 13α-androst-5-ene-3β,17α-diol as colorless plates melting at approximately 192–193° and further characterized by a specific rotation of —122° in 1% chloroform solution. The product has the formula

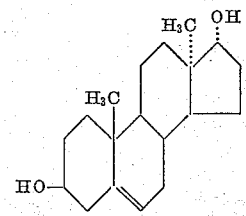

Example 2

*13α-androst-5-ene-3β,17-diol.*—The mother liquors deriving from the crystallization of 13α-androst-5-ene-3β,17α-diol in Example 1 are combined and stripped of solvent by vacuum distillation. The residue, recrystallized from a mixture of ether and pentane, affords colorless laths melting at approximately 162.5–163.5° and having a specific rotation in 0.5% chloroform solution of —99°. The product thus obtained is 13β-androst-5-ene-3β,17β-diol, of the formula

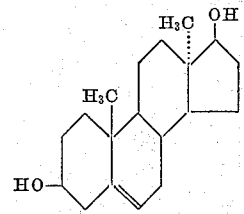

Example 3

*3β,17α-diacetoxy-13α-androst-5-ene.*—A solution of 10 parts of 13α-androst-5-ene-3β,17α-diol in a mixture of 42 parts of pyridine and 42 parts of acetic anhydride is allowed to stand at room temperature for 20 hours, then diluted with ice water. The oil which precipitates solidifies on standing. Filtered off, washed with water, dried in air, and crystallized from aqueous methanol, it affords 3β,17α-diacetoxy-13α-androst-5-ene as colorless massive rhombs melting at approximately 93–93.5° and having a specific rotation of —109.5° in 1% chloroform solution. The product has the formula

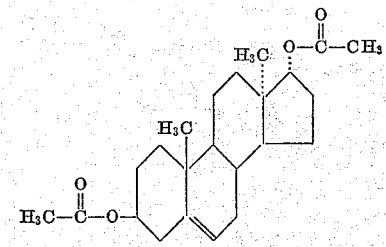

Example 4

*3β,17α-dipropionyloxy-13α-androst-5-ene.*—A solution of 20 parts of 13α-androst-5-ene-3β,17α-diol in a mixture of 177 parts of pyridine and 179 parts of propionic anhydride is allowed to stand at room temperatures for 18 hours, then poured into 5 volumes of ice water. The mixture thus obtained is acidified with 5% hydrochloric acid. The oil thrown down solidifies on standing. Filtered off, washed with water, dried in air, and recrystallized from aqueous methanol, it affords 3β,17α-dipropionyloxy-13α-androst-5-ene as colorless rods melting at approximately 74–75°. The product has the formula

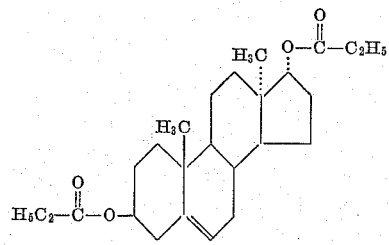

What is claimed is:
1. A compound of the formula

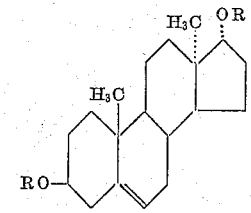

wherein R represents a member of the class consisting of hydrogen and lower alkanoyl radicals.
2. 13α-androst-5-ene-3β,17α-diol.
3. 3β,17α-diacetoxy-13α-androst-5-ene.
4. 3β,17α-dipropionyloxy-13α-androst-5-ene.

References Cited in the file of this patent
Jones et al.: J.A.C.S., vol. 70, 1948, pp. 2024–2034 (QD 1 A 5).